Oct. 16, 1928. Re. 17,103

T. C. GRAHAM

DOMINO AND ART OF MAKING THE SAME

Original Filed Nov. 9, 1926

Inventor
Tom C. Graham
By his Attorneys
Cooper, Kerr & Dunham

Reissued Oct. 16, 1928.

Re. 17,103

UNITED STATES PATENT OFFICE.

TOM C. GRAHAM, OF ALBANY, NEW YORK, ASSIGNOR TO THE EMBOSSING COMPANY, OF ALBANY, NEW YORK, A CORPORATION OF NEW YORK.

DOMINO AND ART OF MAKING THE SAME.

Original No. 1,675,891, dated July 3, 1928, Serial No. 147 234, filed November 9, 1926. Application for reissue filed August 28, 1928. Serial No. 302,621.

In the manufacture of dominoes by the method most commonly in use the domino is formed by die-pressing a wooden blank, the die which shapes the face being provided with one or more raised portions which produce a corresponding number of depressions or recesses in the face of the blank, which depressions are afterwards painted or otherwise colored to form the pips or dots. In the method referred to, which has been in use for nearly sixty years without change in principle, a separate face-die is required for each domino denomination, so that for a set in which the denominations range from "double blank" to "double six", twenty-eight different dies are needed, while for the popular "double-nine" set no less than fifty-five dies are necessary. The same applies to molds for making dominoes by molding a plastic composition, as many different molds being needed as there are different denominations in the set. It is easily seen that the dies or molds are subject to deterioration in use, chiefly by reason of wear. Hence they must be replaced from time to time, and at substantial expense, since dies and molds of the quality and accuracy required are costly.

According to my present invention as carried out in the preferred way, only a single die or mold is needed for an entire set. This single die is constructed with at least as many pip-forming portions or recesses as the number of pips required for a domino of high denomination, so that all the dominoes will have recessed pip-areas in excess of the numbers needed for lower denominations. The pip-areas are also shaped and arranged to produce an ornamental or pleasing design on the face of the domino. Having formed the dominoes, each with the maximum number of recessed pip-areas, the latter are painted or otherwise colored to form the different denominations. For example, for a set of "double-six", which requires twenty-eight dominoes, one is left with all its pip-areas uncolored. This is the double-blank. On another a single area is colored, on one end of the domino, to make the "blank-one". On another, two areas are colored, to make the blank-two, and so on with the entire set, the double-six being formed by coloring all twelve pip-areas.

Referring to the accompanying drawing.

Figure 1:
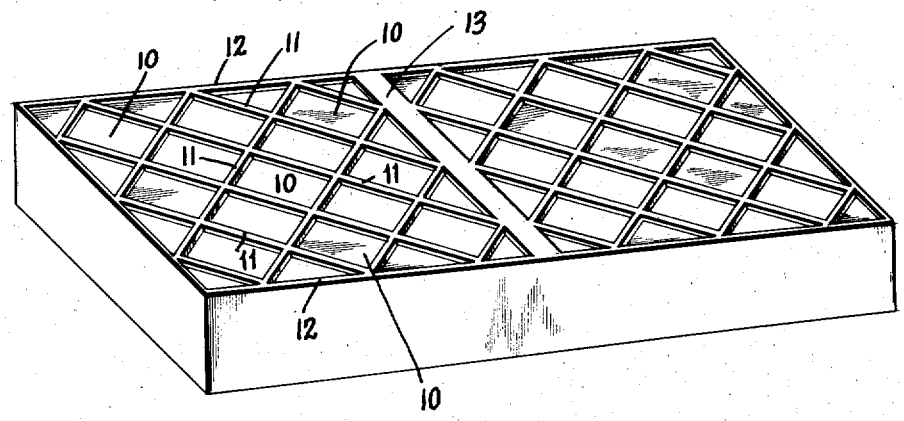
Fig. 1 shows in perspective a domino made by my method.
Figure 2:
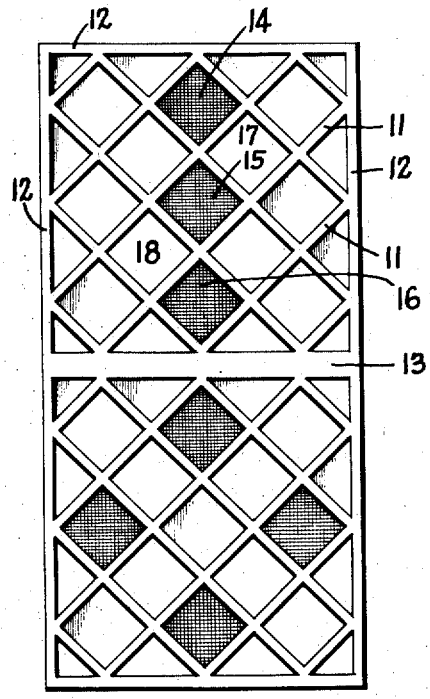
Fig. 2 is a plan view of the same domino with seven pip-areas colored, making a "three-four".

In the dominoes illustrated, the pip-areas, as 10, are square, or, in general, polygonal, and are separated from each other by ribs 11. Stated otherwise, the pip-areas and the intervening spaces are at different elevations. The dominoes shown are also bounded by marginal ribs 12, and the two halves are separated by a transverse rib 13. In the case of square pip-recesses they are preferably arranged with their diagonals vertical and horizontal, that is, parallel to the ends and sides of the block. The blocks shown have thirteen pip-areas in each half, and hence can be used to make a double-thirteen set or a lesser number, as for example double-six or double-nine, by coloring the appropriate pip-areas, the areas for coloring being preferably those which are symmetrically located with respect to the vertical or horizontal center line of the half containing such spaces. For example, in Fig. 2, the colored areas 14, 15, 16 in the upper half are symmetrical with respect to both center lines or axes, as are also the four colored areas in the lower half. It will be understood, however, that any other arrangement, symmetrical or unsymmetrical, can be used if desired. Usually, however, it is better to adopt arrangements which are not only symmetrical but also sharply distinctive. A more or less diamond-shape contour, square or rhomboidal, for the pip-areas is also desirable, as affording a pleasing appearance and also permitting adjoining areas to be colored alike and still be distinctly separate to the eye. Thus in the top half of Fig. 2, the player at a single glance sees three pips, even though they are adjoining, whereas if areas 17, 15 and 18 were colored alike their number would be much less readily seen.

The color or colors used for the recessed pip-areas should be contrastive with respect to the other portions of the domino, especially the ribs or other intervening spaces. Preferably the block is black or some other dark color to mask the soiling incident to handling, and the pips are white, but for convenience the dominoes illustrated are shown as being white with black pips.

Figure 3:
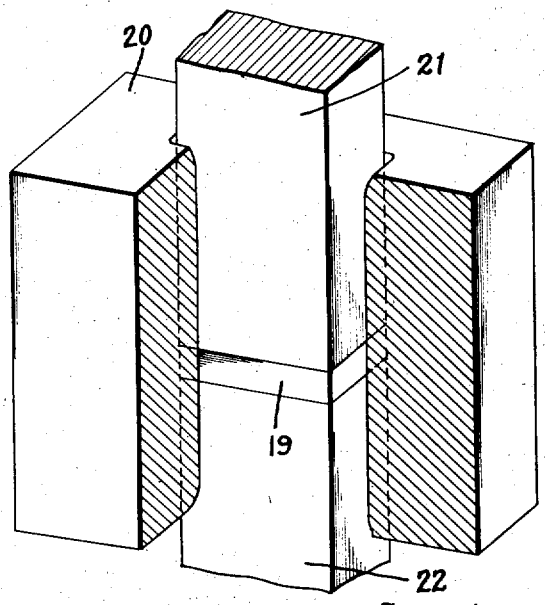
Fig. 3 is a perspective view illustrating diagrammatically a convenient method of shaping wooden dominoes.

The dominoes are preferably made of dry hard wood with the grain perpendicular to the face, the block being powerfully compressed to increase the density of the wood, impart a smooth polished finish, and form the recessed pip-areas and intervening spaces. These operations can be conveniently performed by any suitable means, as for example the dies illustrated diagrammatically in Fig. 3. The block 19, cut somewhat larger than the finished domino is to be, is placed in the flaring top of the tubular die 20. It is then pushed down into the die by the plunger die 21, which also presses it against the lower die 22. The end of one of the dies 21, 22 is shaped to form pip-recesses of the desired shape and arrangement and the end of the other may have an ornamental pattern, so that the two faces of the domino are correspondingly embossed.

It is to be understood that the invention is not limited to the details herein specifically described, since these may be varied within the spirit of the invention defined by the appended claims.

I claim:

1. In the art of making dominoes, the improvement comprising shaping the dominoes and providing each with pip-areas in numbers suitable for dominoes of high denominations and separated from each other by intervening spaces of the same color as but different elevation from the pip-areas themselves, and coloring different numbers of pip-areas on the several dominoes contrastively to the other pip-areas to provide the desired denominations, dominoes of lower denominations being left with one or more pip-areas of the same color as the intervening spaces.

2. In the art of making dominoes, the improvement comprising shaping the dominoes and forming the face of each with ribs providing recessed areas of lower elevation bounded and separated by the ribs but of the same color as the latter and in number equal to the number of pips required for a domino of high denomination, and coloring different numbers of areas on the several dominoes contrastively to the other pip-areas to provide the pips for the desired denominations, leaving excess areas with the same color as the ribs.

3. In the art of making dominoes, the improvement comprising shaping the dominoes and forming the face of each with ribs forming an ornamental symmetrical pattern providing recessed areas of lower elevation of the same color as the ribs and bounded and separated by the ribs and in number equal to the number of pips required for a domino of high denomination, and coloring different numbers of such areas on the several dominoes contrastively to the other area to provide the pips for the desired denominations, leaving the excess areas with the same color as the ribs.

4. In the art of making dominoes, the improvement comprising shaping the dominoes and forming the face of each with ribs intersecting at right angles to provide right-angled areas of lower elevation bounded and separated by the ribs and in number equal to the number of pips required for a domino of high denomination, and coloring different numbers of areas on the several dominoes to provide the pips for the desired denominations, leaving the excess areas uncolored.

5. In the art of making dominoes, the improvement comprising shaping the dominoes and providing each with polygonal pip-areas in numbers suitable for dominoes of high denominations and separated from each other by intervening spaces of different elevation from the pip-areas themselves, and coloring and leaving uncolored different numbers of pip-areas on different dominoes to provide different denominations.

6. A set of dominoes each having on its face recessed pip-areas in numbers suitable for dominoes of high denomination, bounded and separated from each other by intervening spaces of the same color, the areas of different dominoes being distinctively colored in different numbers to form pips of different denominational numbers, each domino of lower denomination having one or more pip-areas of the same color as the intervening spaces.

7. A set of dominoes each having on its face ribs defining intermediate areas of lower elevation separated by the ribs and in number equal to the number of pips of a domino of high denomination, different numbers of such areas being distinctively colored on the several dominoes to form the different denominations and the other areas being of the same color as the ribs.

In testimony whereof I hereto affix my signature.

TOM C. GRAHAM.